United States Patent
Sakai

[11] Patent Number: 6,056,094
[45] Date of Patent: May 2, 2000

[54] HYDRAULIC CONTROL DEVICE FOR AUTOMATIC TRANSMISSION

[75] Inventor: Hiromasa Sakai, Yokosuka, Japan

[73] Assignee: Nissan Motor Co., Ltd., Yokohama, Japan

[21] Appl. No.: 09/111,702

[22] Filed: Jul. 8, 1998

[30] Foreign Application Priority Data

Jul. 9, 1997 [JP] Japan ................................. 9-183993

[51] Int. Cl.[7] ................................................ F16H 45/02
[52] U.S. Cl. .................................................... 192/3.3
[58] Field of Search ..................... 192/3.3, 3.29; 74/732.1

[56] References Cited

U.S. PATENT DOCUMENTS

| | | | |
|---|---|---|---|
| 4,051,932 | 10/1977 | Arai et al. ................................. | 192/3.3 |
| 4,998,604 | 3/1991 | Vukovich et al. ........................ | 192/3.3 |
| 5,058,716 | 10/1991 | Lippe et al. ............................ | 192/3.3 X |
| 5,090,527 | 2/1992 | Imamura et al. ........................ | 192/3.29 |
| 5,163,540 | 11/1992 | Mainquist et al. ...................... | 192/3.3 |
| 5,211,083 | 5/1993 | Hattori et al. .......................... | 192/3.3 X |
| 5,305,862 | 4/1994 | Gierer ...................................... | 192/3.3 |
| 5,339,935 | 8/1994 | Ishii et al. .................................. | 192/3.3 |
| 5,513,732 | 5/1996 | Goates ...................................... | 192/3.3 |

FOREIGN PATENT DOCUMENTS

| | | |
|---|---|---|
| 39 37 939 | 6/1990 | Germany . |
| 4-78369 | 3/1992 | Japan . |

*Primary Examiner*—Rodney H. Bonck
*Attorney, Agent, or Firm*—Foley & Lardner

[57] ABSTRACT

A hydraulic control device controls hydraulic fluid for shifting an automatic transmission by a pressure control valve, and supplies operating hydraulic fluid diverted from the pressure control valve via a torque converter pressure passage to a lock up clutch of the torque converter. A lubrication passage which lubricates the automatic transmission is connected via an orifice to a torque converter pressure passage, and the pressure in this torque converter pressure passage is limited by a regulator valve to a predetermined upper limit value. Further, there is included a bypass valve which directly supplies hydraulic fluid from the torque converter pressure passage via the orifice to the lubrication passage when the pressure in the torque converter pressure passage rises above a predetermined pressure. On the one hand, at times of low speed vehicle operation, the engagement pressure for the lock up clutch is ensured by the orifice, while also at times of high load the amount of lubrication hydraulic fluid is increased by the bypass valve.

8 Claims, 8 Drawing Sheets

HYDRAULIC CONTROL DEVICE FOR AUTOMATIC TRANSMISSION

FIELD OF THE INVENTION

This invention relates to a hydraulic control device for an automatic transmission for an automotive vehicle which incorporates a lock up clutch.

BACKGROUND OF THE INVENTION

A kind of automatic speed change mechanism for an automotive vehicle comprising a system which combines a torque converter equipped with a lock up clutch and an automatic transmission equipped with a forward/reverse change-over mechanism has, for example, been disclosed in Tokkai Hei 4-78369 published by the Japanese Patent Office in 1992.

In this speed change system, control of the speed changing of the automatic transmission, engagement and disengagement of the lock up clutch, and lubrication of the automatic transmission are performed by the use of pressurized hydraulic fluid from a single hydraulic pump. Hydraulic fluid which lubricates hydraulic transmission is supplied via a lubrication passage from a torque converter pressure passage which operates the lock up clutch.

Although this hydraulic pump may be constructed as a vane pump, the output pressure of such a pump is reduced when the temperature of the hydraulic fluid is high so that its viscosity is low, and also at times of low vehicle speed. In this connection, in order to ensure an adequate pressure for the engagement of the lock up clutch, an orifice is provided between the torque converter pressure passage and the lubrication passage.

On the other hand, when the automatic transmission is subject to high load, i.e. when the torque which is being transmitted by the automatic transmission is high, it is necessary to increase the amount of the lubrication hydraulic fluid for the automatic transmission.

In this case, although the output pressure of the hydraulic pump may be sufficiently high, the pressure in the torque converter pressure passage is controlled to a set pressure by a relief valve. As a result, even when the automatic transmission is being subjected to high load, it is difficult to make considerable increases to the flow of hydraulic fluid supplied from the torque converter pressure passage via the orifice to the lubrication passage.

SUMMARY OF THE INVENTION

It is therefore an object of this invention both to ensure an adequate pressure in the torque converter pressure passage when the output pressure of the hydraulic pump is low, and also to ensure an adequate amount of lubrication at times of high load.

In order to achieve the above object, this invention provides a hydraulic control device for use with an automatic transmission which is connected to a torque converter comprising a lock up clutch. The device comprises a pressure control valve which controls hydraulic pressure supplied to the automatic transmission, a torque converter pressure passage which supplies hydraulic fluid for operating the lock up clutch from the pressure control valve to the lock up clutch, a lubrication passage which supplies hydraulic fluid for lubrication to the automatic transmission, an orifice which joins the torque converter pressure passage to the lubrication passage, and a regulator valve which limits the pressure in the torque converter pressure passage to a predetermined upper limit value. The device further comprises a bypass valve detouring the orifice for supplying hydraulic fluid from the torque converter pressure passage to the lubrication passage when the pressure in the torque converter pressure passage rises above a predetermined value.

It is preferable that the bypass valve comprises the regulator valve and the regulator valve comprises a torque converter pressure port which communicates with the torque converter pressure passage, a drain port which vents the pressure in the torque converter pressure passage, a lubrication port which communicates with the lubrication passage, and a member which connects the torque converter pressure port to the drain port and the lubrication port when the pressure in the torque converter pressure passage rises above a predetermined value.

In this case, it is further preferable that the device further comprises a solenoid valve which generates a first signal pressure, a solenoid valve which generates a second signal pressure, and a pressure modifier valve which regulates the second signal pressure according to the first signal pressure to produce a third signal pressure, the pressure control valve comprises a member which controls the pressure supplied to the automatic transmission in accordance with the first signal pressure, and the regulator valve comprises a port which varies the predetermined value according to the third signal pressure.

It is also preferable that the device further comprises a solenoid valve which generates a first signal pressure, and that the pressure control valve comprises a member which controls the pressure which is supplied to the automatic transmission in accordance with the first signal pressure, and the bypass valve comprises a lock up regulator valve which comprises a member which fixes the predetermined pressure according to the first signal pressure.

It is also preferable that the lock up clutch comprises a first hydraulic fluid chamber which locks up the torque converter and a second hydraulic fluid chamber which unlocks the torque converter, and that the device further comprises a lock up control valve which selectively connects the torque converter pressure passage to either the first hydraulic fluid chamber or the second hydraulic fluid chamber.

It is also preferable that the device further comprises a solenoid valve which generates a first signal pressure, the bypass valve comprises the aforesaid regulator valve which has a torque converter pressure port which is communicated to the torque converter pressure passage, a drain port which vents the pressure in the torque converter pressure passage, a lubrication port which communicates with the lubrication passage, a signal pressure port to which the first signal pressure is fed, a member which connects the torque converter pressure port to the drain port and the lubrication port when the pressure in the torque converter pressure passage rises above the predetermined value, and a member which adjusts the predetermined value according to the pressure at the signal pressure port.

It is further preferable that the regulator valve further comprises another torque converter pressure port which communicates with the torque converter pressure port, the connecting member comprises a first spool, the predetermined pressure adjustment member comprises a second spool which is arranged in series with the first spool with a spring between them, the signal pressure port exerts the first signal pressure upon one end of the second spool, and the other torque converter pressure port exerts the pressure in the torque converter pressure passage upon one end of the first spool in a direction opposite to the first signal pressure.

It is further preferable that the regulator valve further comprises a stopper which prevents displacement of the second spool due to the pressure at the signal pressure port past a predetermined position.

The details as well as other features and advantages of this invention are set forth in the remainder of the specification and are shown in the accompanying drawings.

DESCRIPTION OF THE PREFERRED EMBODIMENTS

Figure 1:
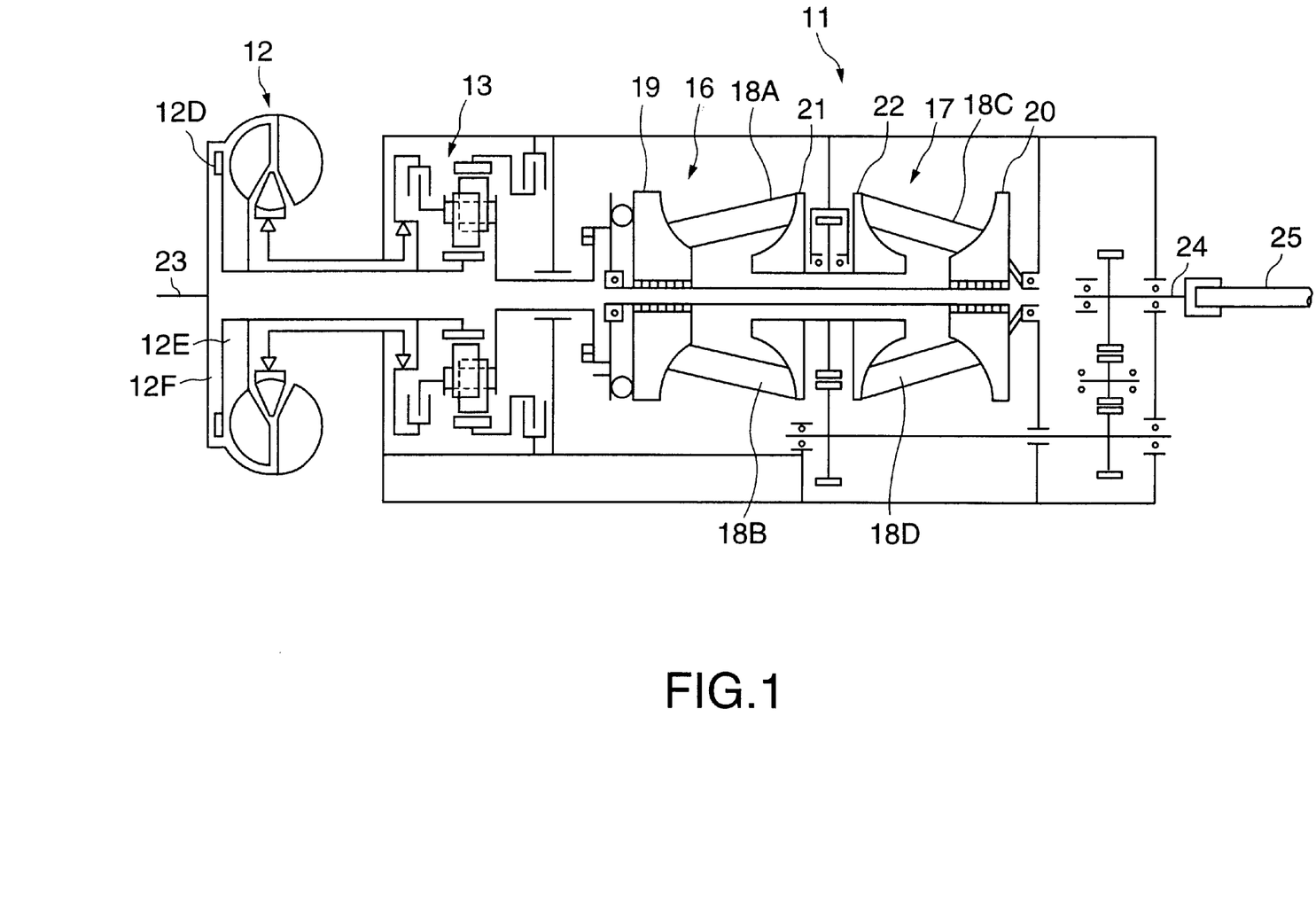
FIG. 1 is a schematic diagram of an automatic transmission system to which this invention is applied.

Referring to FIG. 1 of the drawings, an automatic transmission system for an automotive vehicle to which this invention Is applied comprises a torque converter 12 which is equipped with a lock up clutch 12D, and an automatic transmission 11 which is equipped with a forward/reverse change-over mechanism 13. The rotation of an engine not shown in the figures is input to a power input shaft 23 of the torque converter 12, and a power output shaft 24 of the automatic transmission 11 rotates drive wheels of the vehicle via a propeller shaft 25.

The automatic transmission 11 is a toroidal continuously variable transmission comprising a first toroidal speed change section 16 and a second toroidal speed change section 17. In the first section 16, a power input disk 19 and a power output disk 21 between which power rollers 18A and 18B are squeezed. The second toroidal speed change section 17 comprises power input disk 20 and a power output disk 22 between which power rollers 18C and 18D are squeezed. Due to the inclination of the power rollers 18A through 18D being varied by hydraulic fluid pressure, this transmission 11 can provide any desired speed change ratio. This type of toroidal continuously variable transmission is known from U.S. Pat. No. 5,542,890, for example.

Figure 2:
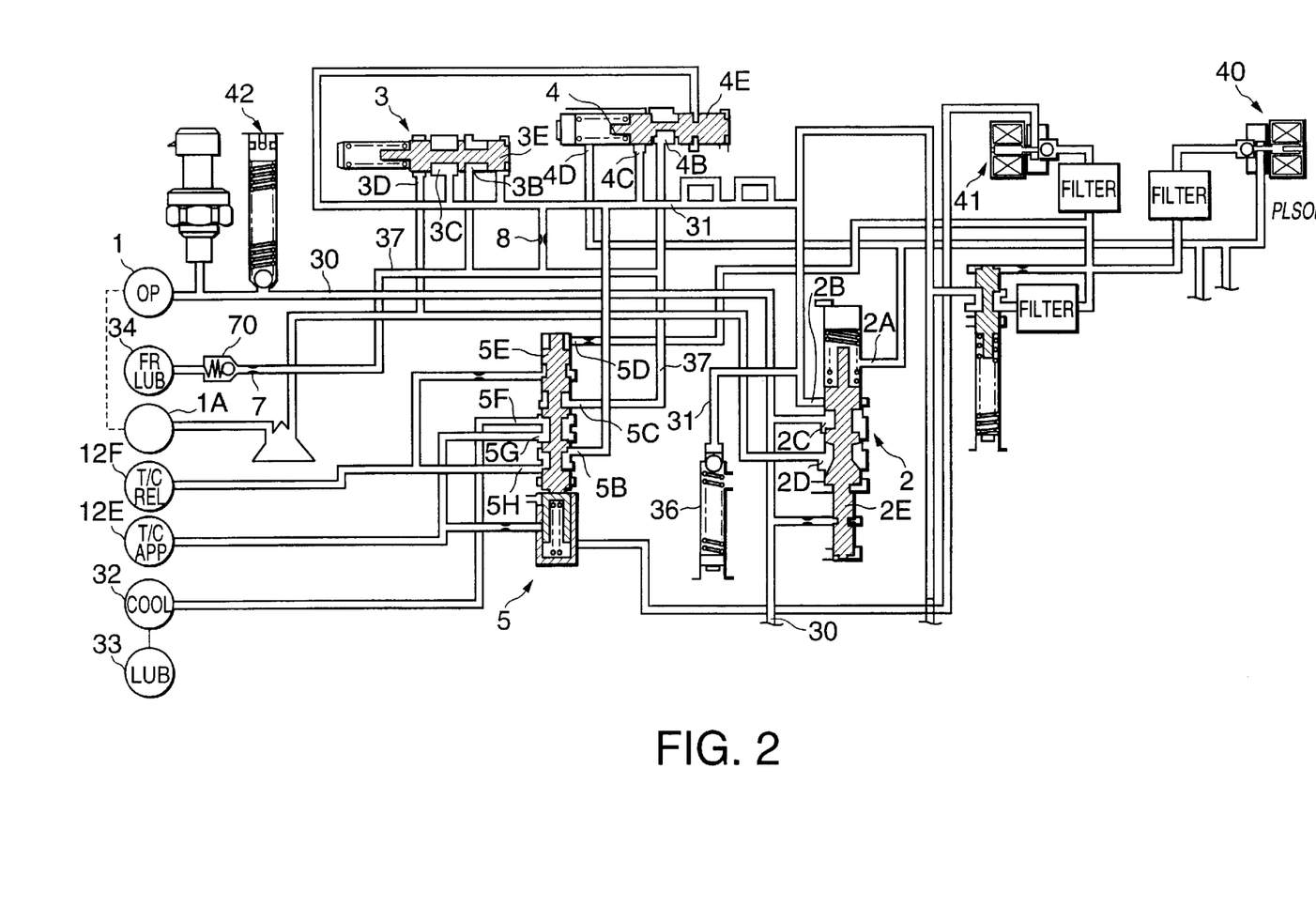
FIG. 2 is a hydraulic conduit diagram of a hydraulic control device for the automatic transmission system, according to this invention.

This automatic transmission system is controlled by a hydraulic control device shown in FIG. 2.

In this hydraulic control device, hydraulic fluid which is pressurized by a hydraulic pump 1 which is driven by the engine is supplied to a line pressure passage 30, and is regulated to a predetermined line pressure PL by a pressure control valve 2 provided in the line pressure passage 30. The speed change ratio of the automatic transmission 11 is controlled using this line pressure PL. The line pressure PL is controlled by a relief valve 42 so as not to exceed a predetermined upper limit.

The pressure control valve 2 comprises a port 2A to which is supplied a signal pressure PLSOL from a line pressure solenoid valve 40 which is duty ratio controlled by an electronic controller not shown in the figures, and a spool 2E which is driven responsive to the signal pressure PLSOL led to the port 2A. This signal pressure PLSOL corresponds to the first signal pressure of the claims.

This pressure control valve 2 communicates a port 2C which leads to the line pressure passage 30 either to a port 2B or to a drain port 2D, according to the displacement of the spool 2E.

The port 2B is connected to a torque converter pressure passage 31 which operates the lock up clutch 12D of the torque converter 12.

The drain port 2D is connected via a strainer to an intake port IA of the hydraulic pump 1, and reticulates the hydraulic fluid in the line pressure passage 30 to the intake side of the hydraulic pump 1.

Accordingly, the pressure control valve 2 regulates both the line pressure PL and also the pressure PT/C in the torque converter pressure passage 31 in response to the signal pressure PLSOL.

In the torque converter pressure passage 31 there are provided a lock up control valve 5, a T/C regulator valve 3, a lock up regulator valve 4, and an orifice 8.

The lock up control valve 5 comprises a spool 5E which is driven in response to a signal pressure PL/USOL from a lock up solenoid valve 41 which is duty controlled by the electronic controller. In response to the displacement of this spool 5E, the pressure PT/C is selectively supplied either via a port 5G to a first hydraulic fluid chamber 12E of the lock up clutch 12D, or via a port 5H to a second hydraulic fluid chamber 12F of the lock up clutch 12D. This signal pressure PL/USOL corresponds to the second signal pressure of the claims.

The lock up control valve 5 further comprises a port 5C which is connected to a lubrication passage 37, and in response to the displacement of the spool 5E, this port 5C is connected to a port 5F which leads to an oil cooler 32 and a main lubrication passage 33.

In other words, when the spool is displaced and the port 5G is connected to the port 5B, i.e. in parallel with the engagement of the lock up clutch 12D, the port 5F is connected to the port 5C, and hydraulic fluid is supplied from the lubrication passage 37 to the oil cooler 32 and the main lubrication passage 33.

The main lubrication passage 33 supplies hydraulic fluid to such areas as the rotational shafts of the first and second toroidal speed change sections 16 and 17 of the automatic transmission 11 for the purpose of lubrication.

The lubrication passage 37 is further connected to a front section lubrication passage 34 via an orifice 7 and a check valve 70. The front section lubrication passage 34 is a passage which supplies hydraulic fluid to the forward/reverse change-over mechanism 13 of the automatic transmission 11 for the purpose of lubrication.

The T/C regulator valve 3 is a valve which controls the pressure PT/C to be within an upper limit pressure withstand value PT/Cmax for the torque converter 12, and comprises a torque converter pressure port 3C which is connected to the torque converter pressure passage 31, a lubrication port 3B, and a drain port 3D. The lubrication port 3B is connected to a lubrication passage 37, while the drain port 3D is connected via a strainer to the intake port 1A of the hydraulic pump 1.

This T/C regulator valve 3 selectively connects the torque converter pressure port 3C to the lubrication port 3B or to the drain port 3D according to the displacement of a spool 3E which is driven responsive to the balance between the pressure PT/C and the pressure of a spring which is opposed thereto.

The lock up regulator valve 4 is a valve for ensuring the supply pressure to the first hydraulic fluid chamber 12E of the torque converter 12 in precedence to the supply of hydraulic fluid to the main lubrication passage 33 and front section lubrication passage 34.

This lock up regulator valve 4 comprises a port 4B which is connected to the lubrication passage 37, a port 4C which is connected to the torque converter pressure passage 31, and a port 4D to which the signal pressure PLSOL is fed, and it connects the ports 4B and 4C together according to the displacement of the spool 4E.

The torque converter pressure PT/C acts upon one end of the spool 4E, and the signal pressure PLSOL acts on the other end of the spool 4E via the port 4D. Further, a spring assists the signal pressure PLSOL.

According to this pressure balance, the spool 4E either connects or disconnects the torque converter pressure passage 31 and the lubrication passage 37, and so obtains the pressure necessary for the engagement of the lock up clutch 12D, by giving priority to the torque converter pressure PT/C in the torque converter pressure passage 31 over the supply of hydraulic fluid to the lubrication passage 37.

A relief valve 36 is provided in the torque converter pressure passage 31. This relief valve 36 prevents excessive pressure from being supplied to the first hydraulic fluid chamber 12E and the second hydraulic fluid chamber 12F, if for example the lock up control valve 5 freezes.

Figure 3:
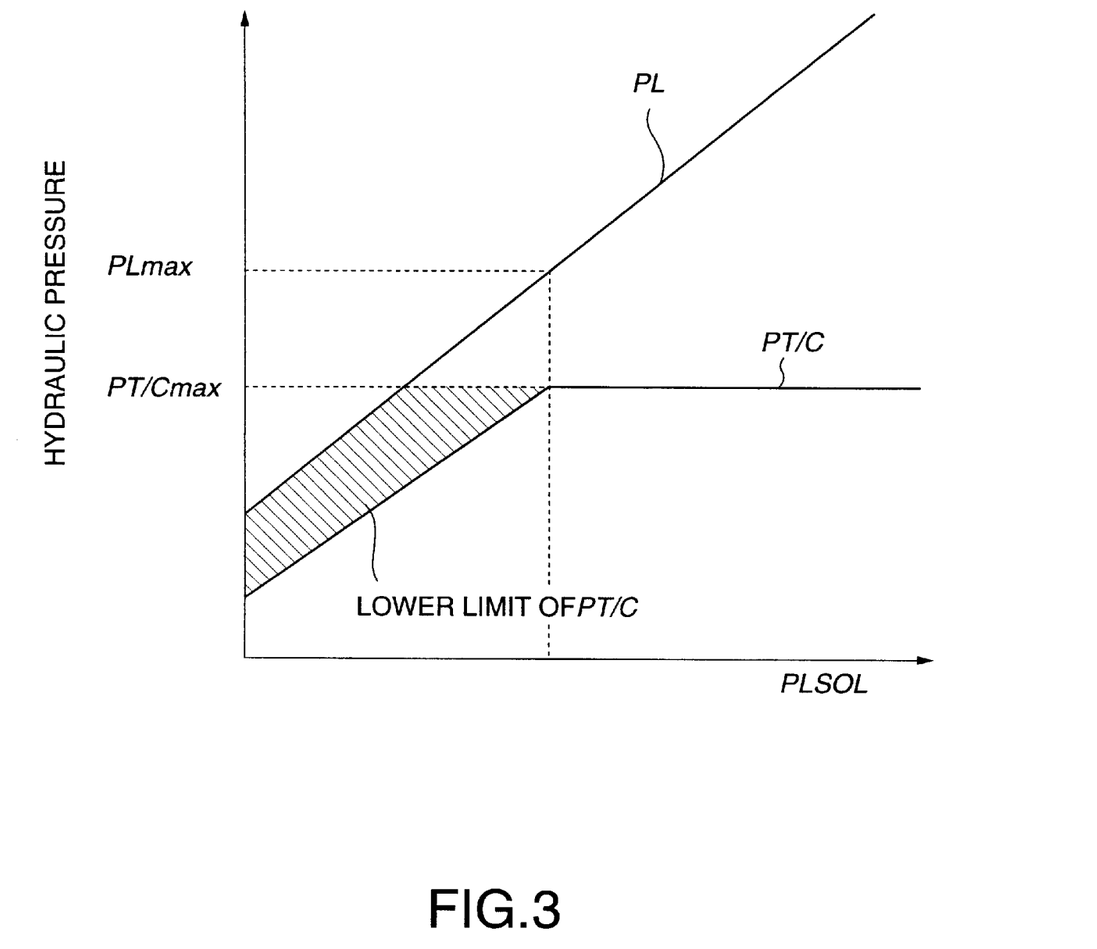
FIG. 3 is a graph specifying a relationship between a signal pressure PLSOL, a line pressure PL, and a torque converter pressure PT/C according to this invention.

With regard to the above described hydraulic passages, the hydraulic pump 1 which is driven by the engine expels pressurized hydraulic fluid into the line pressure passage 30, and the pressure control valve 2 controls the line pressure PL in this line pressure passage 30 so as to keep it proportional to the signal pressure PLSOL from the line pressure solenoid valve 40, as shown in FIG. 3.

The pressure of the pressurized hydraulic fluid which flows into the torque converter pressure passage 31 from the line pressure passage 30 via the port 2B of the pressure control valve 2 is kept lower than the upper limit value PT/Cmax by the T/C regulator valve 3. Although this pressurized hydraulic fluid is supplied to the lubrication passage 37 via the port 4B of the lock up regulator valve 4, the lock up regulator valve 4 performs pressure control to ensure the torque converter pressure PT/C required for the engagement of the lock up clutch 12D rather to supply hydraulic fluid to the lubricating passage 37.

The lock up regulator valve 4 as shown in FIG. 2 displaces the spool 4E to the right as seen in the figure according to an increase in the signal pressure PLSOL, and cuts off the port 4C until the ratio between the torque converter pressure PT/C and the signal pressure PLSOL exceeds a predetermined value. By doing this, since the supply of hydraulic fluid to the lubrication passage 37 via the port 4B is prevented, it is possible to ensure a torque converter pressure PT/C which is sufficient for engagement of the lock up clutch 12D. It should be noted that even in this case a small quantity of hydraulic fluid is supplied to the lubrication passage 37 from the torque converter pressure passage 31 via the orifice 8.

The port 4C opens according to the balance between the signal pressure PLSOL and the torque converter pressure PT/C. On opening, the lower limit value for the torque converter pressure PT/C is accordingly raised along with the signal pressure PLSOL, as shown in FIG. 3. By this kind of characteristic of the lock up regulator valve 4, the torque converter pressure PT/C maintains a relationship between the line pressure PL and the lower limit value as shown by the sloping line in the figure.

After the lower limiting value reaches a set pressure PT/Cmax of the T/C regulator valve 3 due to an increase in the signal pressure PLSOL, the torque converter pressure PT/C is maintained at the set pressure PT/Cmax of the T/C regulator valve 3.

Accordingly it is possible to prevent the torque converter pressure PT/C from varying and to ensure a sufficient pressure for locking up the torque converter 12.

When the temperature of the hydraulic fluid is high and also the vehicle speed is low, the amount of hydraulic fluid used increases, due to low fluid viscosity, in relation to the amount thereof provided by the hydraulic pump 1, and as a result the line pressure PL drops. Even in this kind of situation no problem occurs with regard to engagement of the lock up clutch 12, because the torque converter pressure PT/C is kept above the lower limit value.

On the other hand, in operational circumstances when the automatic transmission 11 requires a large quantity of hydraulic fluid for lubrication, as when a high load is imposed upon the automatic transmission or the like, the necessary flow amount of lubrication in the main lubrication passage 33 and the front section lubrication passage 34 is easily provided, since hydraulic fluid is supplied to the lubrication passage 37 from the lock up regulator valve 4 as well as the T/C regulator valve 3 and the orifice 8. In this situation, the rise of the line pressure PL is limited to the upper limit value PT/Cmax set by the T/C regulator valve 3. There is no danger that the pressure acting upon the torque converter 12 may become excessive, since this upper limit value PT/Cmax is set below the upper limit pressure withstand value of the torque converter 12, and therefore no influence is exerted upon the durability of the torque converter 12.

Furthermore, in contrast to the fact that the required torque converter pressure for locking up is ensured even when line pressure PL is low, it is possible during high load conditions to increase the amount of hydraulic fluid for lubrication so as not to adversely affect the durability of the torque converter 12.

Yet further, even in the region in which the line pressure PL is low, if the output of the hydraulic pump 1 has sufficient margin, even in the region in which the torque converter pressure PT/C does not rise to its upper limit value PT/Cmax, the lock up regulator valve 4 supplies hydraulic fluid from its port 4C to its port 4B, and supplies hydraulic fluid to the lubrication passage 37, so that the lubrication of the automatic transmission 11 does not fail.

Figure 4:
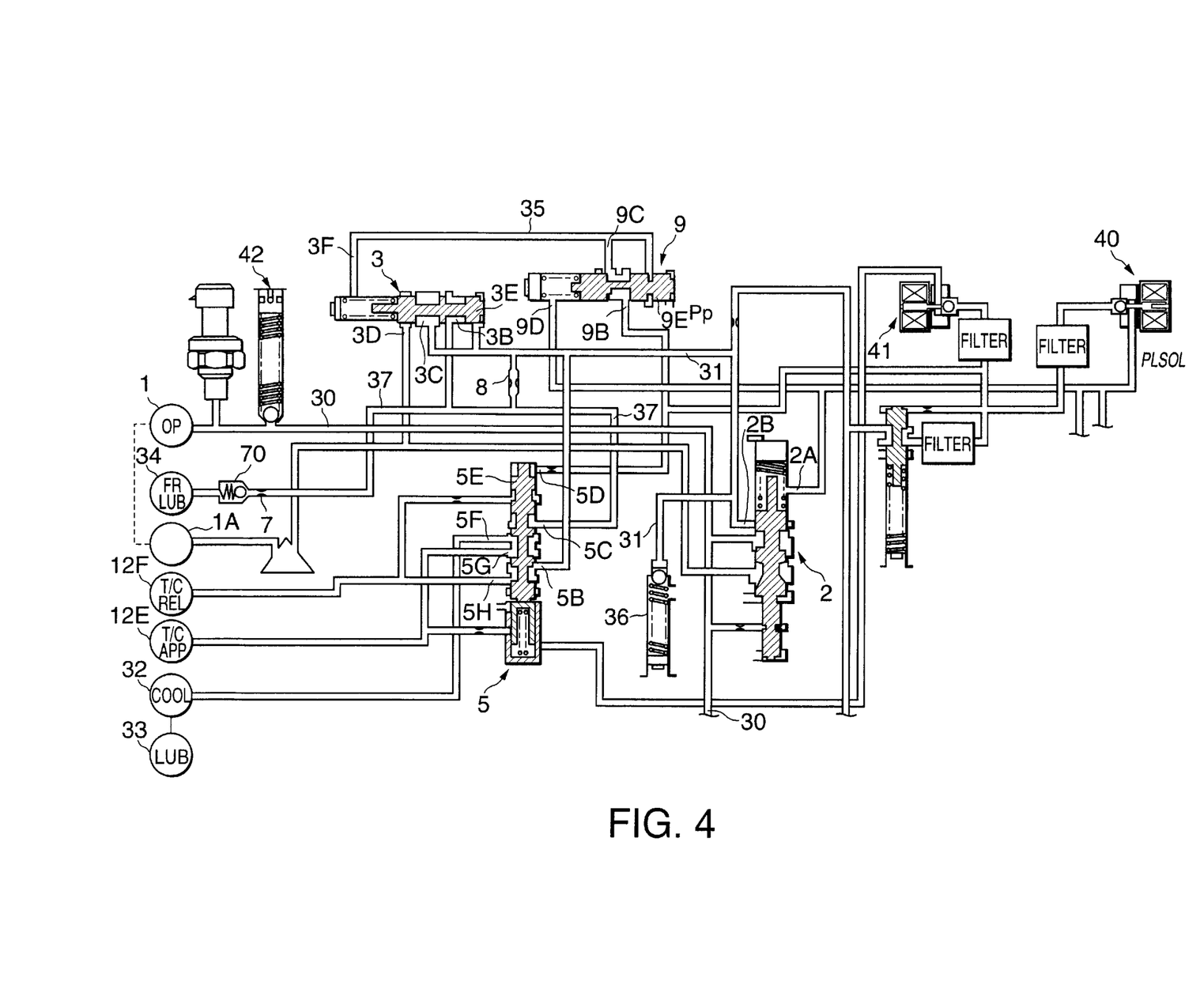
FIG. 4 is similar to FIG. 2, but showing a second embodiment of this invention.
Figure 5:
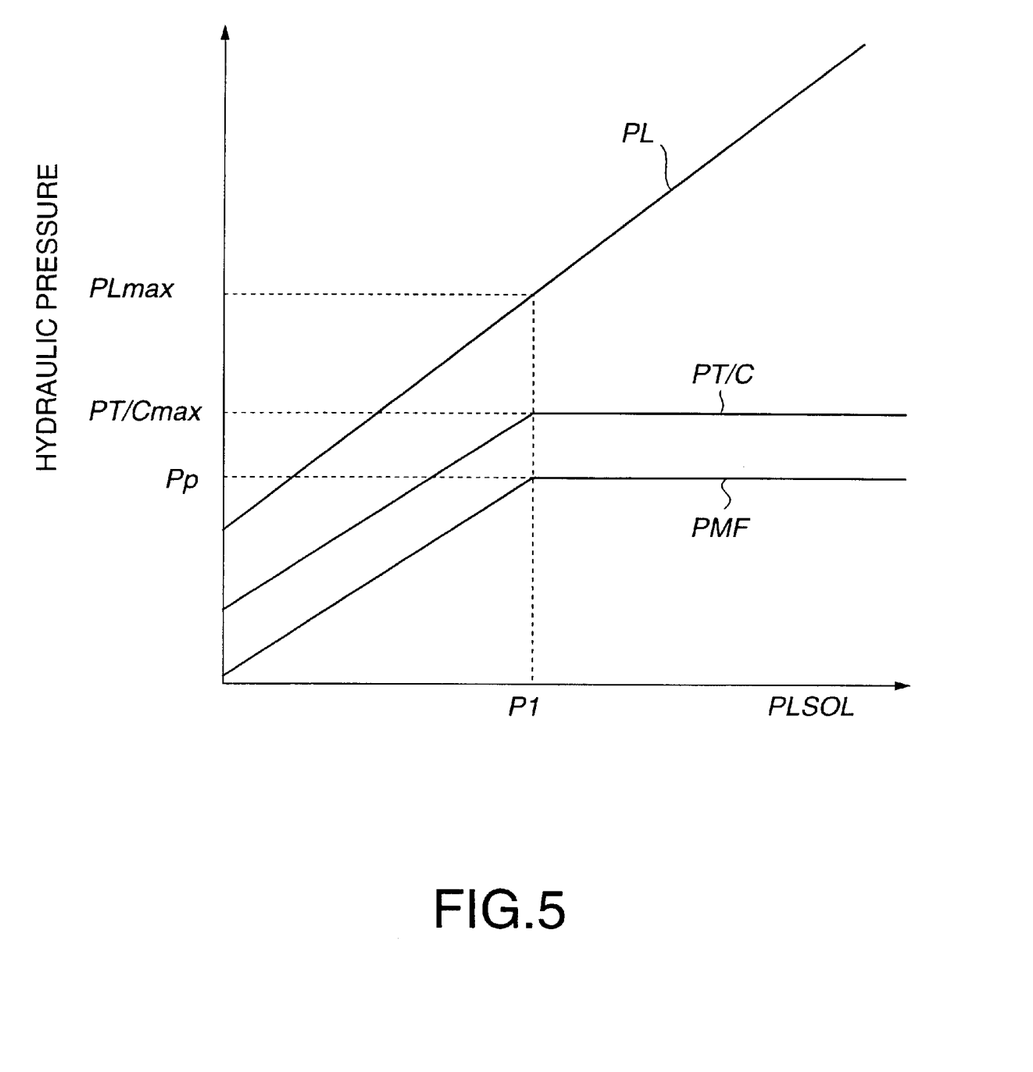
FIG. 5 is similar to FIG. 3, but showing the second embodiment of this invention.

FIGS. 4 and 5 show a second embodiment of this invention.

In this embodiment, a pressure modifier valve 9 is provided instead of the lock up regulator valve 4 of the first embodiment described above.

This pressure modifier valve 9 comprises ports 9B, 9C, and 9D, and the ports 9B and 9C are communicated together by the displacement of a spool 9E. The port 9D is formed so as to face one end of the spool 9E, and the signal pressure PLSOL is fed to this port 9D from the line pressure solenoid valve 40. The pressure modifier valve 9 further comprises a spring which biases the spool 9E in the same direction.

The signal pressure PL/USOL is fed to the port 9B from the lock up solenoid valve 41 as a constant pressure Pp, so as to oppose the signal pressure PLSOL.

As a result, the spool 9E is displaced in response to the signal pressure PLSOL, and the pressure level of the hydraulic fluid at the port 9B is modified according the position to which said spool 9E is displaced, and is supplied to the port 9C as a pressure modifier pressure PMF. This pressure modifier pressure PMF corresponds to the third signal pressure of the claims.

The port 9c is connected via a hydraulic fluid passage 35 to a port 3F which faces the base end of the spool 3E of the T/C regulator valve 3.

By doing this, the pressure modifier pressure PMF and the pressure of the spring are applied at one end of the spool 3E of the T/C regulator valve 3. The torque converter pressure PT/C acts upon the other end of the spool 3E so as to oppose these pressures, in the same way as in the first embodiment described above.

The spool 3E, according to the balance of these pressures, connects the torque converter pressure port 3C, to which is fed the pressure in the torque converter pressure passage 31, either to the lubrication port 3B which is connected to the lubrication passage 37, or to the drain port 3D which is connected to the intake port IA of the hydraulic pump 1. By doing this, the T/C regulator valve 3 performs control so as to keep the torque converter pressure PT/C within a range in which it does not exceed its upper limit value PT/Cmax, and moreover so as to keep it at the pressure which is required for engagement of the lock up clutch 12D.

The pressure modifier valve 9 increases the pressure modifier pressure PMF in accordance with increase of the signal pressure PLSOL until the signal pressure PLSOL reaches a predetermined value P1, as shown in FIG. 5. Further, the T/C regulator valve 3 increases the torque converter pressure PT/C in the torque converter pressure passage 31 in accordance with increase of the pressure modifier pressure PMF from the T/C regulator valve 3.

If the signal pressure PLSOL exceeds its predetermined value P1, then the pressure modifier pressure PMF becomes equal to the constant pressure Pp which is applied to the port 9B. At this time, the pressure modifier pressure PMF is set so that the torque converter pressure PT/C comes to be equal to its upper limit value PT/Cmax.

In this embodiment as well, in the same way as with the first embodiment described above, if the line pressure is low, on the one hand the torque converter pressure PT/C which is necessary for locking up is ensured while during high load the amount of hydraulic fluid for lubrication is increased, and thereby it is possible to ensure that the durability of the torque converter 12 does not suffer.

Further, according to this second embodiment, it is possible easily to adapt the construction to different torque converters whose pressure withstand values are different, just by varying the constant pressure Pp which is applied to the pressure modifier valve 9.

Figure 6:
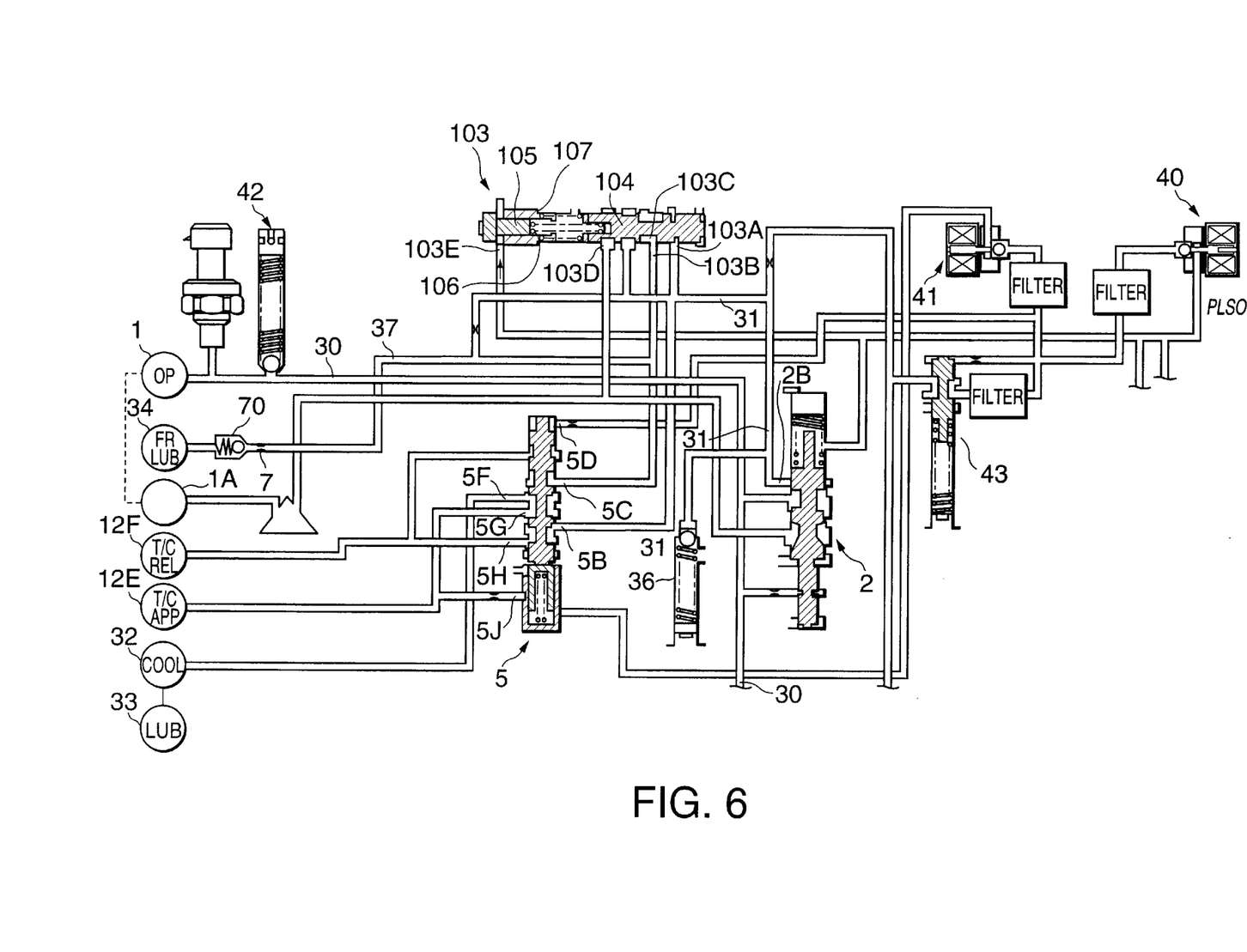
FIG. 6 is similar to FIG. 2, but showing a third embodiment of this invention.
Figure 7:
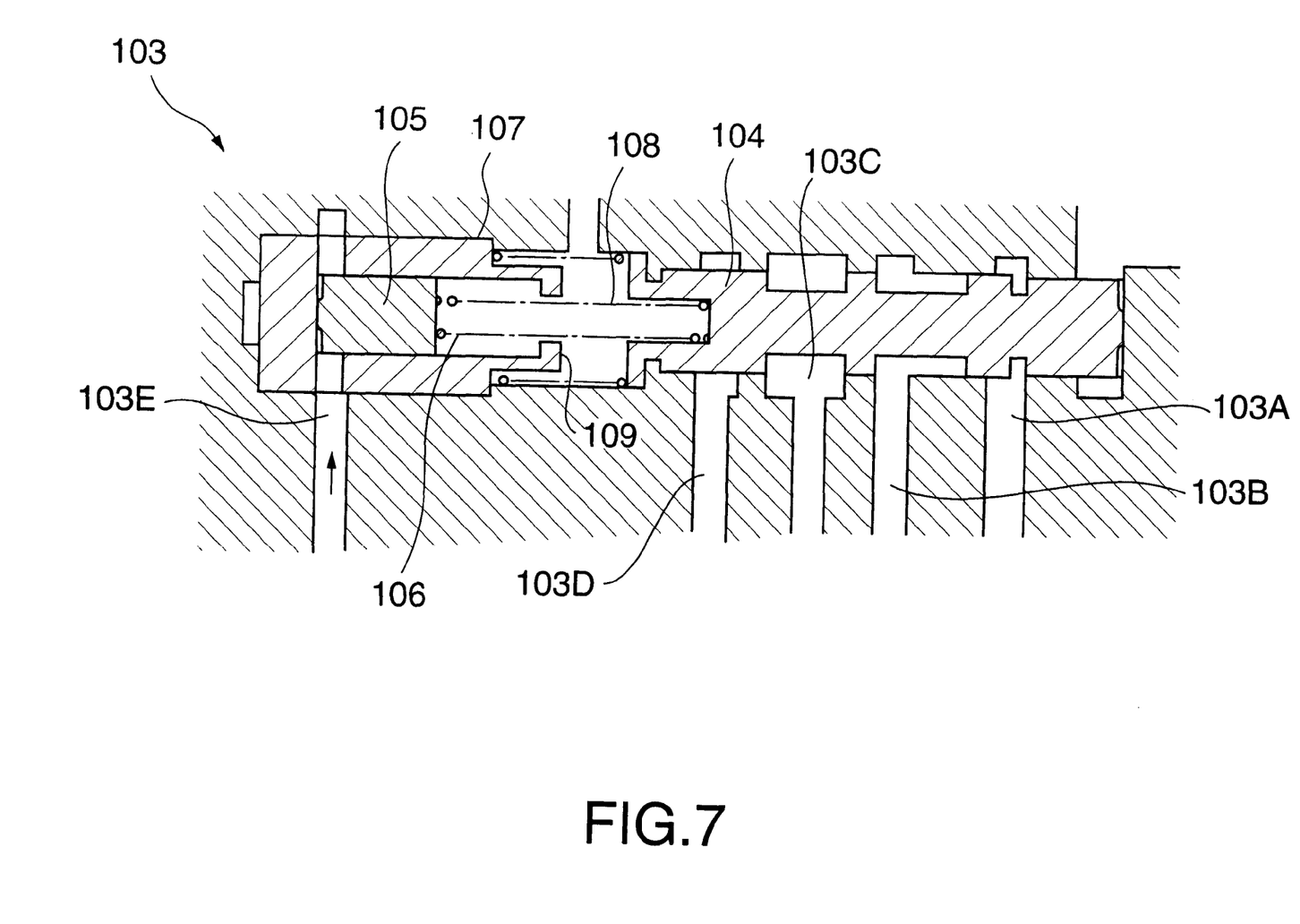
FIG. 7 is an enlarged view of a T/C regulator valve shown in FIG. 6.
Figure 8:
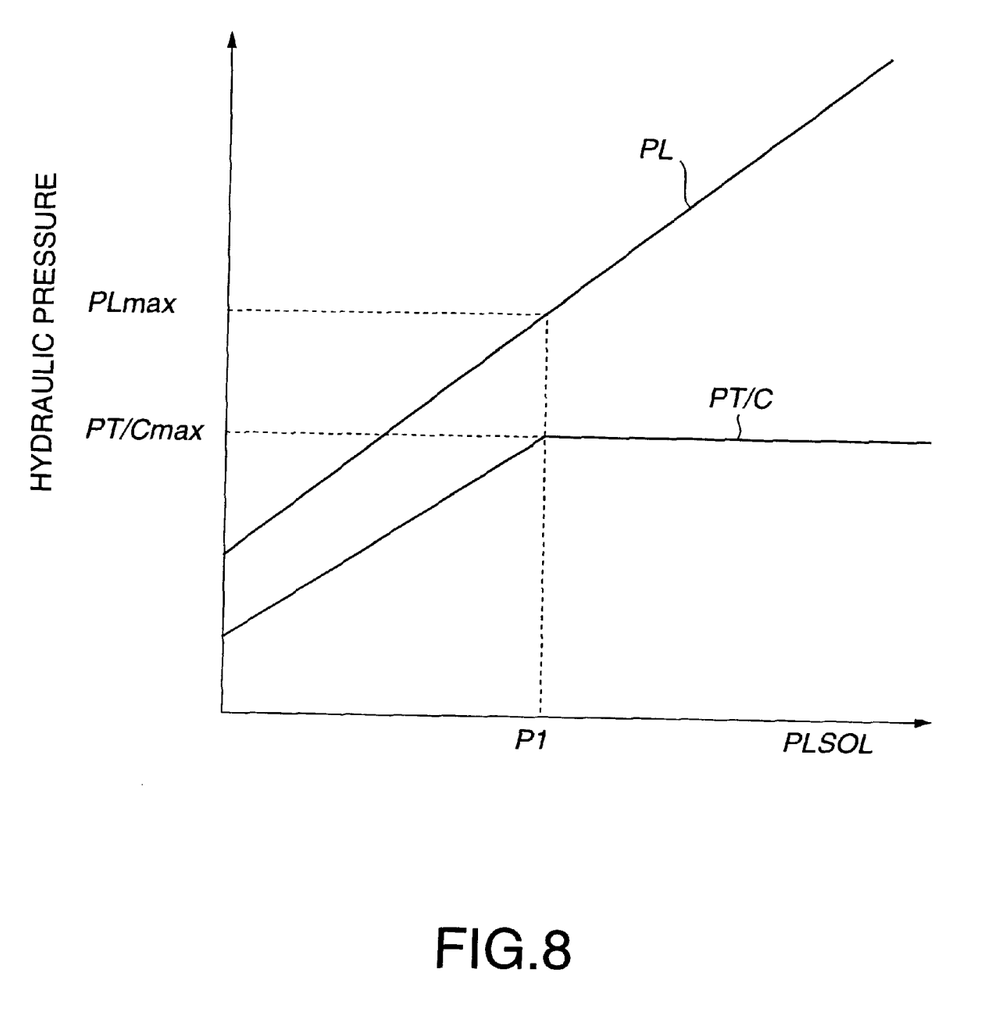
FIG. 8 is similar to FIG. 4, but showing the third embodiment of this invention.

FIGS. 6 through 8 show a third embodiment of this invention.

This embodiment is one in which the T/C regulator valve 3 of the first embodiment and the lock up regulator valve 4 are combined into a single T/C regulator valve 103, as shown in FIG. 6. This TIC regulator valve 103 comprises two spools 104 and 105 arranged in series with a spring 106 between them, as shown in FIG. 7.

This T/C regulator valve 103 further comprises a torque converter pressure port 103C which is connected to the torque converter pressure passage 31, another torque converter pressure port 103A which allows the torque converter pressure PT/C to act upon the spool 104 in its axial direction, a lubrication port 103B which is connected to the lubrication passage 37, and a drain port 103D which is connected to the intake port 1A of the hydraulic pump 1.

When the spool 104 is displaced leftwards in FIG. 7, then the torque converter pressure ports 103C and 103B are connected together and the torque converter pressure passage 31 is connected to the lubrication passage 37. When the spool 104 is displaced yet further leftwards, the torque converter pressure port 103C and the drain port 103D are connected together, and the torque converter pressure passage 31 is also connected to the intake port 1A of the hydraulic pump 1 as well.

The spool 105 is arranged to be coaxial with the spool 104. The T/C regulator valve 103 comprises a signal pressure port 103E through which the signal pressure PLSOL acts upon the spool 105 in its axial direction.

The spool 105 is pressed towards and against the spool 104 in response to increase of this signal pressure PLSOL. In a sleeve 107 which houses the spool 105 there is formed a claw shaped stopper 109 which prevents further displacement of the spool 105 towards the side of the spool 104 when it exceeds a predetermined value.

The characteristic of this T/C regulator valve 103 is shown in FIG. 8.

Since the line pressure is low in the region where the signal pressure PLSOL is low, the torque converter pressure PT/C is also low. In this case, the spool 105 biases the spool 104 in the rightward direction in FIGS. 6 and 7 via the spring 106 with increases in the signal pressure PLSOL. As a result of this pressure the spool 104 is kept in its position in which its ports 103B and 103D are cut off from one another, as shown in the figures. Due to this, dropping of the torque converter pressure PT/C is prevented, and sufficient hydraulic fluid pressure for locking up thereof is assured.

When the signal pressure PLSOL exceeds a predetermined value, further displacement of the spool 105 is prevented by the stopper of the sleeve 107 On the other hand, since the torque converter pressure PT/C which is supplied to the pressure port 103A of the torque converter continues to increase further, the spool 104 is displaced towards the spool and contacts thereto against the resistance of the spring 106, thus connecting the torque converter pressure port 103C to the lubrication port 103B. Further, it is also connected to the drain port 103D. By doing this, along with supplying the operating hydraulic fluid in the torque converter pressure passage 31 to the lubrication hydraulic fluid passage 37, the torque converter pressure PT/C is kept below its upper limit value PT/Cmax.

Accordingly, in the same way as with the first embodiment described above, on the one hand a torque converter pressure PT/C which is required for locking up is ensured when the line pressure PL is low while, in the high load condition when the line pressure PL becomes high, the supply of hydraulic fluid for lubrication to the main lubrication passage 33 and the front section lubrication passage 34 is increased. Moreover, this has a desirable benefit for the durability of the torque converter 12, since the torque converter pressure PT/C is controlled so as to be kept below its predetermined upper limit value PT/Cmax.

Further, according to this embodiment, since, with the single T/C regulator valve 103, the limit value PT/Cmax is controlled and also a required torque converter pressure PT/C for lock up is ensured, the number of valves in the hydraulic control device is reduced, which makes it possible to reduce the size and weight of the hydraulic control device.

It should be noted that in the above described third embodiment the T/C regulator valve 3, the lock up regulator valve 4, and the T/C regulator valve 103 together constitute a bypass valve.

The embodiments of this invention in which an exclusive property or privilege is claimed are defined as follows:

What is claimed:

1. A hydraulic control device for use with an automatic transmission which is connected to a torque converter comprising a lock up clutch, said device comprising:
   a pressure control valve which controls hydraulic pressure supplied to said automatic transmission;
   a torque converter pressure passage which supplies hydraulic fluid for operating said lock up clutch from said pressure control valve to said lock up clutch; a lock up control valve which is provided in said torque converter pressure passage and controls engagement and disengagement of said lock up clutch;
   a lubrication passage which supplies hydraulic fluid for lubrication to said automatic transmission;
   an orifice which is provided between said pressure control valve and said lock up control valve and joins said torque converter pressure passage to said lubrication passage;
   a regulator valve which limits the pressure in said torque converter pressure passage to within a predetermined upper limit value; and
   a bypass valve detouring said orifice for supplying hydraulic fluid from said torque converter pressure passage to said lubrication passage when the pressure in said torque converter pressure passage rises above a predetermined value.

2. A hydraulic control device according to claim 1, further comprising a solenoid valve which generates a first signal pressure, and wherein said pressure control valve comprises a member which controls the pressure which is supplied to said automatic transmission in accordance with said first signal pressure, and said bypass valve comprises a lock up regulator valve which comprises a member which fixes said predetermined pressure according to said first signal pressure.

3. A hydraulic control device according to claim 1, wherein said lock up clutch comprises a first hydraulic fluid chamber which locks up said torque converter and a second hydraulic fluid chamber which releases the locking up of said torque converter, and said lock up control valve selectively connects said torque converter pressure passage to either of said first hydraulic fluid chamber and said second hydraulic fluid chamber.

4. A hydraulic control device for use with an automatic transmission which is connected to a torque converter comprising a lock up clutch, said device comprising:
   a pressure control valve which controls hydraulic pressure supplied to said automatic transmission;
   a torque converter pressure passage which supplies hydraulic fluid for operating said lock up clutch from said pressure control valve to said lock up clutch;
   a lock up control valve which is provided in said torque converter pressure passage and controls engagement and disengagement of said lock up clutch;
   a lubrication passage which supplies hydraulic fluid for lubrication to said automatic transmission;
   an orifice which is provided between said pressure control valve and said lock up control valve and joins said torque converter pressure passage to said lubrication passage;
   a regulator valve which limits the pressure in said torque converter pressure passage to within a predetermined upper limit value and which detours said orifice for supplying hydraulic fluid from said torque converter pressure passage to said lubrication passage when the pressure in said torque converter pressure passage rises above a predetermined value;
   wherein said regulator valve comprises a torque converter pressure port which is communicated to said torque converter pressure passage, a drain port which vents the pressure in said torque converter pressure passage, a lubrication port which is communicated to said lubrication passage, and a member which connects said torque converter pressure port to said drain port and said lubrication port when the pressure in said torque converter pressure passage rises above said predetermined value.

5. A hydraulic control device according to claim 4, further comprising a solenoid valve which generates a first signal pressure, a solenoid valve which generates a second signal pressure, and a pressure modifier valve which regulates said second signal pressure according to said first signal pressure to produce a third signal pressure, wherein said pressure control valve comprises a member which controls the pressure supplied to said automatic transmission in accordance with said first signal pressure, and said regulator valve comprises a port which varies said predetermined value according to said third signal pressure.

6. A hydraulic control device for use with an automatic transmission which is connected to a torque converter comprising a lock up clutch, said device comprising:
   pressure control valve which controls hydraulic pressure supplied to said automatic transmission;
   a torque converter pressure passage which supplies hydraulic fluid for operating said lock up clutch from said pressure control valve to said lock up clutch;
   a lock up control valve which is provided in said torque converter pressure passage and controls engagement and disengagement of said lock up clutch;
   a lubrication passage which supplies hydraulic fluid for lubrication to said automatic transmission;
   an orifice which is provided between said pressure control valve and said lock up control valve and joins said torque converter pressure passage to said lubrication passage;
   a regulator valve which limits the pressure in said torque converter pressure passage to within a predetermined upper limit value and which detours said orifice for supplying hydraulic fluid from said torque converter pressure passage to said lubrication passage when the pressure in said torque converter pressure passage rises above a predetermined value; and
   a solenoid valve which generates a first signal pressure;
   wherein said regulator valve comprises a torque converter pressure port which is communicated to said torque converter pressure passage, a drain port which vents the pressure in said torque converter pressure passage, a lubrication port which is communicated to said lubrication passage, a signal pressure port to which said first signal pressure is fed, a member which connects said torque converter pressure port to said drain port and said lubrication port when the pressure in said torque converter pressure passage rises above said predetermined value, and a member which adjusts said predetermined value according to the pressure at said signal pressure port.

7. A hydraulic control device according to claim 6, wherein said regulator valve further comprises another torque converter pressure port which is communicated to said torque converter pressure port, said connecting member comprises a first spool, said predetermined pressure adjustment member comprises a second spool which is arranged in series with said first spool with a spring between them, said signal pressure port exerts said first signal pressure upon one end of said second spool, and said other torque converter pressure port exerts the pressure in said torque converter pressure passage upon one end of said first spool in a direction opposite to said first signal pressure.

8. A hydraulic control device according to claim 7, wherein said regulator valve further comprises a stopper which prevents displacement of said second spool due to the pressure at said signal pressure port past a predetermined position.

* * * * *